United States Patent [19]

Dombroski et al.

[11] 4,136,138
[45] Jan. 23, 1979

[54] CYANOACRYLATE DENTAL ADHESIVE COMPOSITIONS

[75] Inventors: John R. Dombroski, Kingsport; Diane M. Stoakley, Church Hill, both of Tenn.

[73] Assignee: Eastman Kodak Company, Rochester, N.Y.

[21] Appl. No.: 708,160

[22] Filed: Jul. 23, 1976

[51] Int. Cl.² ............................................. C08L 33/14
[52] U.S. Cl. ................... 260/881; 32/14 A; 32/15; 260/885
[58] Field of Search ............... 260/881, 885; 32/14 A, 32/15

[56] References Cited

U.S. PATENT DOCUMENTS

| | | | |
|---|---|---|---|
| 3,250,002 | 5/1966 | Collito | 32/14 A |
| 3,640,972 | 2/1972 | Bolger et al. | 260/881 |
| 3,647,498 | 3/1972 | Dougherty | 260/881 |
| 3,654,239 | 4/1972 | McIntire et al. | 260/78.4 N |
| 3,766,132 | 10/1923 | Lee et al. | 32/15 |
| 3,832,334 | 8/1974 | O'Sullivan et al. | 526/271 |
| 3,975,824 | 8/1976 | Lee | 32/14 A |
| 4,010,545 | 3/1977 | Kilian et al. | 32/14 A |

*Primary Examiner*—Harold D. Anderson
*Attorney, Agent, or Firm*—Edward R. Weber; Daniel B. Reece, III

[57] ABSTRACT

An adhesive composition comprising Components A, B and C as follows:
A. a polymerizable monomeric 2-cyanoacrylate containing portion comprising
  1. from 60 to 90 parts by weight of allyl 2-cyanoacrylate;
  2. from 3 to 25 parts by weight of an alkyl 2-cyanoacrylate having the formula

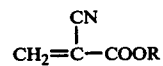

wherein R is alkyl having 60 to 10 carbon atoms;
  3. from 0.25 to 5 parts by weight of a difunctional monomer diester of an acid from the group consisting of acrylic and methacrylic acid and an aromatic diol; and
  4. from 3 to 15 parts by weight of a 2-cyanoacrylate compatible polymeric thickener;
B. from 0.05 to about 1.5 weight percent based upon the weight of component A of a cyclic imino initiator selected from 2,4,6-tri(allyloxy)-S-triazine, 2,4,6-tri(alkyloxy)-S-triazines having 1 to about 20 exocyclic carbon atoms, benzoxazole and substituted benzoxazoles; and
C. an amount of an organic peroxide free radical providing compound sufficient to cause crosslinking of a difunctional monomer diester with the 2-cyanoacrylates.

8 Claims, No Drawings

CYANOACRYLATE DENTAL ADHESIVE COMPOSITIONS

This invention relates to allyl 2-cyanoacrylate-based adhesive compositions which are especially useful as dental adhesives. The compositions of this invention are quick setting, gap-filling and possess excellent adhesion to enamel. Additionally these adhesives exhibit highly advantageous hydrolytic stability.

It has been proposed to use as adhesives the monomeric esters of alpha-cyanoacrylic acids having the general formula

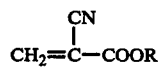

wherein R may be any of the terminal groups consisting of an alkyl group having 1 to 16 carbon atoms, a cyclohexyl group and a phenyl group. Such polymerizable monomer adhesives are described for example in U.S. Pat. No. 2,794,788. Additionally, the use of these cyanoacrylate adhesives as dental elements have been described in U.S. Pat. No. 3,839,065 and U.S. Pat. No. 3,663,501. The compositions of this invention are cyanoacrylate dental adhesives that exhibit fast setting properties, gap filling capability, and hydrolytic stability, far superior to the compositions disclosed in these prior art patents. In particular, this invention is concerned with a polymerizable composition comprising a mixture of allyl 2-cyanoacrylate, a $C_6$–$C_{10}$ alkyl 2-cyanoacrylate, a difunctional monomer diester, a polymeric thickener, and an organic peroxide. The adhesive composition is subsequently compounded with a cyclic imino initiator just prior to use and applied to the enamel surface of teeth as a thick layer. After several minutes the composition of this invention polymerizes to a hard sealant that exhibits excellent adhesion to the enamel, as well as good moisture resistance.

One of the areas most susceptible to dental decay is the occlusal or biting surface of posterior teeth. This region is characterized by the presence of deep pits and fissures on molar surfaces that may often extend to the enamel-dentin interface. Together with debris and organic deposits, microorganisms colonize pits and fissures and lead to the development of occlusal caries. In recent years, adhesive resins have received considerable attention as potential pit and fissure sealants. The purpose of these sealants is to bond to the tooth enamel and isolate the pits and fissures from the oral environment. Since 1965, several sealants have been introduced as aids in preventative dentistry to seal pits and fissures in newly erupted molar teeth. The various sealant types that have been clinically evaluated include polyurethanes (J. Dent. Res., 133–140, 1971), the bisphenol A — glycidyl methacrylate adduct (J. Dent. Child., 35, 253–262, 1968), as well as cyanoacrylates. Clinical reports indicate the rubbery polyurethane compositions do not produce durable, long lasting bonding to the enamel (Brit. Dent. J., 133, 146–151, 1972). The bisphenol A — glycidyl methacrylate adduct, containing about 2% benzoin methyl ether, is brushed onto a tooth surface and is polymerized by exposure to ultraviolet light. The successful use of this technique requires several steps including acid etching the teeth, washing, drying, application of the uncured coating, and finally ultraviolet exposure to cure the coating. Methyl 2-cyanoacrylate was the first dental sealant to be tested clinically and to subsequently demonstrate the feasibility of occlusal sealing as a caries preventive technique. However, methyl 2-cyanoacrylate lacks the ability to be cured in thick films and suffered from loss of adhesive coverage by hydrolytic degradation on exposure to the moist oral environment (J. Dent. Res., 49, 171–173, 1970).

The cyanoacrylate-based sealant compositions of this invention overcome the prior technical deficiencies. The adhesives described in this invention can be rapidly cured in a thick layer and thus provide the gap-filling capability desired for a pit and fissure sealant. The polymerized compositions also exhibit good adhesion to the enamel surface of extracted molar teeth and maintain the adhesion on cycling the coated teeth between boiling water and ice water (4° C.). Extended exposure of the polymerized sealant to 60° C. water indicates excellent hydrolytic stability. Additionally, the compositions of this invention also find use as adhesives for sealing cavity margins, for attaching crowns, caps, inlays and pins, for restoration of incisal fractures and for bonding to dentin. In particular, bonding to dentin historically has been a difficult task due to the heterogeneity of the dentin surface. Also the inability to obtain a suitably dry surface, because of the rapid transport of fluids from the pulp tissue, has prevented the use of conventional adhesives that require a scrupulously dry surface for good bonding.

Accordingly, there is provided an adhesive composition comprising components A, B and C as follows:

A. a polymerizable monomeric 2-cyanoacrylate containing portion comprising
1. from 60 to 90 parts by weight of allyl 2-cyanoacrylate;
2. from 3 to 25 parts by weight of an alkyl 2-cyanoacrylate having the formula

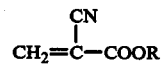

wherein R is alkyl having 6 to 10 carbon atoms;
3. from 0.25 to 5 parts by weight of a difunctional monomer diester of an acid from the group consisting of acrylic and methacrylic acid and an aromatic diol; and
4. from 3 to 15 parts by weight of a 2-cyanoacrylate compatible polymeric thickener;

B. from 0.05 to about 1.5 weight percent based upon the weight of component A of a cyclic imino initiator selected from 2,4,6-tri(allyloxy)-S-triazine, 2,4,6-tri(alkyloxy)-S-triazines having 1 to about 20 exocyclic carbon atoms; and a benzoxazole having the formula

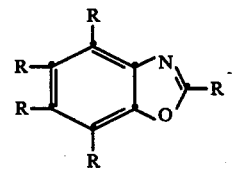

wherein each R is the same or different and represents hydrogen, phenyl, alkyl of 1 to about 20 carbon atoms, chloro or bromo; and C. an amount of an organic peroxide free radical providing compound sufficient to cause crosslinking of the difunctional monomer diester with the 2-cyanoacrylates.

The above compositions are prepared for use by the sequential blending of the preferred portions of the three components A, B and C. After mixing for 30 to 60 seconds, the adhesive is applied to the molar surface with a small brush or spatula applicator. Within 3 to 7 minutes from the time of mixing, the adhesive hardens to a resistant surface that will not chip or flake or be dislodged by applying pressure with a sharp dental explorer.

DESCRIPTION OF COMPONENT A

The allyl 2-cyanoacrylate which is essential to the proper functioning of the invention may be prepared according to the process described in U.S. Pat. No. 3,254,111 incorporated herein by reference. In a preferred embodiment of this invention from 75 to about 85 parts by weight of allyl 2-cyanoacrylate is utilized. It has been found that for the use of the adhesives as pit and fissure sealants at least from 3 to 25 parts by weight of an alkyl 2-cyanoacrylate having the formula

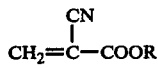

wherein R is alkyl having 6 to 10 carbon atoms is essential. It has been surprisingly found that the combination of the allyl 2-cyanoacrylate and the higher alkyl 2-cyanoacrylate advantageously exhibit properties which render the adhesive composition particularly suitable as a pit and fissure sealant in that the polymerized film has greater flexibility and resists stress cracking during rapid thermal changes. Examples of the 2-cyanoacrylates representative of the above formula are either straight or branched chain hexyl, heptyl, octyl, nonyl or decyl 2-cyanoacrylate.

The difunctional monomer diester of an acid from the group consisting of acrylic and methacrylic acid and an aromatic diol and further identified as component A(3) is present as a crosslinking agent and aids the composition of the invention by increasing the hardness of the polymerized composition as well as improving the resistance of the adhesive to aqueous environments, resulting in improved adhesion to the teeth. In a preferred embodiment of the invention, 0.25 to about 5 (1.5 to about 3 being even more preferred) parts by weight of cross-linking agent is utilized. It is essential the compounds be prepared from acrylic or methacrylic acid and an aromatic diol. It has been found that when other than aromatic diols are used, the polymerized compositions are softer and easily penetrated with a sharp dental explorer. Examples of suitable crosslinking agents are p-xylylene glycol bisacrylate, bisphenol A diacrylate, bis(hydroxyethyl terephthalate) diacrylate, bisphenol A dimethacrylate, and the like. The preferred difunctional monomer diester utilizable in the practice of this invention is bisphenol A dimethacrylate.

The polymeric thickener identified as component A(4) is generally present in an amount from 3 to 15 parts by weight. Preferably, the amount of thickening agent utilized is from about 5 to about 10 parts by weight. The thickener, of course, is added to impart the desired flow properties of the adhesive on the tooth and to reduce the polymerization shrinkage. Many of the thickening agents well known in the art of cyanoacrylate adhesives are generally acceptable for this purpose. It has been found, however, that of the preferred are those selected from a variety of polymers, copolymers, and terpolymers selected from such groups as polyesters, polyolefins, and polyvinyls having thickening characteristics suitable for this application. Specific examples of these thickeners are poly(methyl methacrylate), poly(methyl acrylate-co-acrylonitrile) (60/40 weight percent), poly(ethylacrylate), poly(butyl acrylate), poly(ethyl acrylate-co-butyl acrylate), and the like. The preferred polymeric thickener is poly(methyl methacrylate).

DESCRIPTION OF COMPONENT B

The cyclic imino initiator identified as component B in the compositions of this invention is selected from 2,4,6-tri(allyloxy)-S-triazine, 2,4,6-tri(alkyloxy)-S-triazines having 1 to about 20 exocyclic carbon atoms and benzoxazoles having the formula

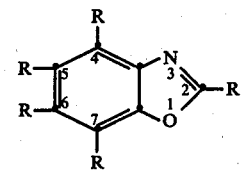

wherein each R is the same or different and represents hydrogen, phenyl, alkyl of 1 to about 20 carbon atoms, chloro or bromo. Preferably R is selected from hydrogen and methyl. Specific examples of these compounds are 2,4,6-tri(ethoxy, n-octyloxy, 2-ethylhexyloxy, octadecyloxy, dodecyloxy, decyloxy, n-pentyloxy, etc.)-S-triazine, benzoxazole, 2-(4-methylphenyl)-benzoxazole, 2,5,6,7-tetramethylbenzoxazole, 2-phenylbenzoxazole and the like. It is to be noted, however, the common initiators disclosed in U.S. Pat. No. 3,839,065 and U.S. Pat. No. 3,940,362 are unsuitable for use in the present invention. It has been found that the amine initiators listed therein do not provide a sufficiently controlled polymerization for the intended purpose of this invention. In a preferred embodiment of this invention the amount of initiator utilized based on the weight of component A is in the range of from 0.05 to about 1.5 weight percent. The preferred initiators are 2,4,6-tri(allyloxy)-S-triazine and 2,4,6-tri(n-propoxy)-S-triazine. These initiators may be obtained commercially or prepared in a manner well known in the art. See for example U.S. Pat. No. 3,163,647.

DESCRIPTION OF COMPONENT C

The organic free radical providing compound identified as Component C in the composition of this invention is a organic peroxide such as those commonly used to affect initiation of polymerization reactions that proceed by means of a free radical mechanism. Examples of such catalysts include aromatic peroxides, including benzoyl peroxide and α-cumyl hydroperoxide, benzoyl peroxide being preferred. Other useful peroxides are lauroyl peroxide, cyclohexanone peroxide, tertbutyl perbenzoate, diisopropyl peroxydicarbonate and the like.

It is suitable that the peroxide be employed in a quantity of from about 0.10 to about 5 parts by weight for each hundred parts by weight of component A.

The pre-polymerized composition of this invention, at the time immediately proceeding reaction, thus comprises a component A comprising the monofunctional monomers and the difunctional monomer, a portion comprising the free radical catalysts component C and a cyclic imino initiator portion component B.

Because contact of the imino initiator with the monofunctional monomers will initiate polymerization, it is essential that such contact not occur until polymerization is desired. On the other hand, the free radical compound, in the absence of ultra-violet light or extreme heat remains quiescent until the reaction mixture becomes warmed by the heat of reaction upon initiation with the imino initiator.

Therefore, a packaged commercial system could be three component:

(1) The adhesive with allyl 2-cyanoacrylate, higher alkyl 2-cyanoacrylate, thickener, and diacrylate, (2) the peroxide, and (3) the initiator. The peroxide may be added to the adhesive component A on the day of use and will remain stable for 7-10 days. The initiator, if dissolved in ethanol, will either be swabbed on the tooth and the ethanol allowed to evaporate before the adhesive application or dropped into the adhesive just prior to distributing the adhesive on the tooth. The first method (surface application of the initiator on tooth) allows for coating a large number of teeth with the same adhesive mixture. Addition of the initiator into the adhesive allows for the placement of the adhesive on 1-2 teeth before polymerization begins.

This invention will be further illustrated by the following examples although it will be understood that these examples are included merely for purposes of illustration and are not intended to limit the scope of the invention.

EXAMPLE 1

This example describes the preparation, application, and testing of a clear cyanoacrylate-based pit and fissure sealant.

Into a three inch diameter aluminum cup is added 0.2 g. of a solution previously prepared from 7.2 g. allyl 2-cyanoacrylate, 1.8 g. octyl 2-cyanoacrylate and 1.0 g. poly(methyl methacrylate). One milligram (1 mg) of benzoyl peroxide and four milligrams (4 mg) of p-xylylene glycol diacrylate are added and stirred until dissolved. One drop (ca. 0.03 g.) of initiator solution, previously prepared by dissolving 1.5 g. of 2,4,6-tri(allyloxy)-s-triazine in 5 g. of dioctyl phthalate, is added and stirred for 30 to 60 seconds with the other components.

An extracted molar tooth was previously prepared by first washing the tooth with a stream of tap water for one minute and then lightly swabbing the surface with a cotton roll saturated with ethanol. A light stream of air was then directed on the tooth surface for fifteen seconds to facilitate removal of excess water. The fully compounded adhesive described above was applied to the molar surface with the aid of a small brush to obtain the desired thickness. After completing the application, the adhesive hardened within two minutes to a clear, hard surface. The coated tooth was placed in boiling water for twenty hours. Subsequent examination of the tooth under a microscope showed no cracks in the coating and the adhesion remained very good.

EXAMPLE 2

This example describes the formulation of a mineral-filled dental adhesive with a paste-like consistency that forms an opaque sealant.

The basic adhesive composition as described in Example 1 was mixed with 10 mg of powdered silicic acid and 20 mg of amorphous silica. This resulted in a smooth paste with a color similar to dental enamel. The adhesive was applied to a molar, previously prepared as in Example 1, and hardened after several minutes to a tough, scratch resistant surface. After forty hours in boiling water, the sealant had good adhesion to the tooth and was free of cracks.

EXAMPLE 3

This example illustrates the importance of the aromatic diacrylate structure, identified as component A(3), in providing a durable, polymerized coating on teeth.

Three adhesive compositions were prepared with the same wt. % of components A(1), A(2), and A(4). The three adhesives, designated X, Y and Z were formulated with 2 wt. % bisphenol A dimethacrylate, 2 wt. % ethylene dimethacrylate, and 2 wt. % neopentyl glycol diacrylate, respectively. The occlusal surface of extracted human molar teeth was water brushed for 1 min. and acid etched for 1 min. with a solution of 50% phosphoric acid containing 7% zinc oxide and 43% water. The teeth were rinsed with water and dried with a light stream of air for 15 seconds. An alcoholic initiator solution of 2,4,6-tri(propoxy)-s-triazine was applied to each occlusal surface with a small brush and the alcohol was evaporated with a light stream of air for 30 sec. The adhesives, X, Y and Z, were applied to the activated surfaces with small brushes to obtain the desired sealant thickness. The adhesives hardened in 2-5 min. to a smooth, clear surface. After 24 hr. at room temperature the coated teeth were placed in boiling water. After 4 hr. the teeth were removed from boiling water and allowed to cool to room temperature. The coatings were then examined with a microscope and photographed to record the sealant profile.

RESULTS

Adhesive X, containing 2 wt.% bisphenol A dimethacrylate, was slightly translucent, had no cracks, and showed smooth edges and good adhesion.

Adhesive Y, containing 2 wt.% ethylene dimethacrylate, was clear, highly cracked and showed poor adhesion and water leakage at the adhesive-enamel interface.

Adhesive Z, containing 2 wt.% neopentyl glycol diacrylate, was clear, highly cracked, and showed poor adhesion and water leakage at the adhesive-enamel interface.

These results clearly demonstrate the unusual enhancement in sealant properties achieved by the use of the aromatic diacrylate (methacrylate) structure.

EXAMPLE 4

This example illustrates the unexpected improvement in hydrolytic stability of a pit and fissure sealant based on allyl 2-cyanoacrylate compared with a pit and fissure sealant based on methyl 2-cyanoacrylate.

Two adhesive compositions were prepared with the same wt.% of components A(2), A(3) and A(4). The two adhesives, designated M and N were formulated with 80 wt.% allyl 2-cyanoacrylate and 80 wt.% methyl 2-cyanoacrylate, respectively. The occlusal surface of extracted human molar teeth was prepared, activated and sealed, exactly as described in Example 3. The teeth were placed in boiling water for 4 hr., then removed, allowed to cool to room temperature and the coatings were examined under a microscope and photographed to reveal the sealant profile.

RESULTS

Adhesive M, containing 80 wt.% allyl 2-cyanoacrylate, was slightly translucent, had no cracks, and showed smooth edges and good adhesion.

Adhesive N, containing 80 wt.% methyl 2-cyanoacrylate had a white powdery surface, the edges were highly eroded and had water leakage at the adhesive-enamel interface.

These results clearly show the unexpected improvement in hydrolytic stability and adhesive retention of allyl 2-cyanoacrylate-based dental adhesive compositions.

EXAMPLE 5

This example illustrates the bonding capability of the allyl 2-cyanoacrylate-based dental adhesive compositions to tooth dentin.

Extracted human incisor teeth were removed from a water-ethanol storage solution. Using a dental burr, the cementum was removed from an area below the enamel crown of the teeth to expose the dentin structure. The dentin was acid etched as in Example 3. A six mil thick section of masking tape, with a 0.155 in. diameter circular hole, was centered over the exposed dentin. The adhesive for bonding was prepared by mixing 0.7 mg. of benzoyl peroxide, 0.5 mg. of 2,4,6-tri(propoxy)-s-triazine and 0.3 g. of a solution previously prepared from 24.0 g. of allyl 2-cyanoacrylate, 3.0 g. of octyl cyanoacrylate, 2.4 g. of poly(methyl methacrylate) and 0.6 g. of bisphenol A dimethacrylate. A drop of the adhesive was placed on the exposed dentin through the hole in the tape. A drop of adhesive was also placed on the stainless steel mesh pad of an orthodontic bracket with a pad diameter of 0.205 in. The pad was carefully centered over the hole and care was taken to ensure that the edges of the bracket pad rested on the tape and did not contact the dentin surface. The adhesive hardened in 3 min. The tensile bond strength of the adhesive to the dentin was measured at a strain rate of 1.0 in./min. and an average value of 992 psi was obtained.

Although the invention has been described in considerable detail with particular reference to certain preferred embodiments thereof, variations and modifications can be effected within the spirit and scope of the invention.

We claim:

1. A solidified adhesive compound exhibiting hydrolytic stability which solidified adhesive compound results from combining components A, B and C as follows:
   A. a polymerizable monomeric 2-cyanoacrylate portion of
      1. from 60 to 90 parts by weight of allyl 2-cyanoacrylate;
      2. from 3 to 25 parts by weight of an alkyl 2-cyanoacrylate having the formula

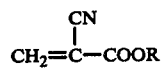

wherein R is alkyl having 6 to 10 carbon atoms;
      3. from 0.25 to 5 parts by weight of a difunctional monomer diester of an acid from the group consisting of acrylic and methacrylic acid and a diol having an aromatic nucleus; and
      4. from 3 to 15 parts by weight of a 2-cyanoacrylate compatible polymeric thickener;
   B. from 0.05 to about 1.5 weight percent based upon the weight of component A of a cyclic imino initiator selected from the group consisting of 2,4,6-tri(allyloxy)-S-triazine, 2,4,6-tri(alkyloxy)-S-triazines having 1 to about 20 exocyclic carbon atoms; and benzoxazoles having the formula

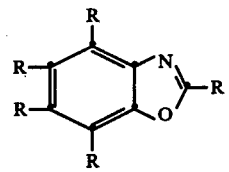

wherein each R is the same or different and represents hydrogen, phenyl, alkyl of 1 to about 20 carbon atoms, chloro or bromo; and
   C. an amount of an organic peroxide free radical providing compound sufficient to cause crosslinking of the difunctional monomer diester with the 2-cyanoacrylates.

2. A solidified adhesive compound exhibiting hydrolytic stability which solidified adhesive compound results from combining components A, B and C as follows:
   A. a polymerizable monomeric 2-cyanoacrylate portion of
      1. from 60 to 90 parts by weight of allyl 2-cyanoacrylate;
      2. from 3 to 25 parts by weight of an alkyl 2-cyanoacrylate having the formula

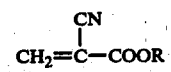

wherein R is alkyl having 6 to 10 carbon atoms;
      3. from 0.25 to 5 parts by weight of a difunctional monomer diester of an acid from the group consisting of acrylic and methacrylic acid an a diol having an aromatic nucleus; and
      4. from 3 to 15 parts by weight of a 2-cyanoacrylate compatible polymeric thickener;
   B. from 0.05 to about 1.5 weight percent based upon the weight of component A of a cyclic imino initiator selected from the group consisting of 2,4,6-tri(allyloxy)-S-triazine and 2,4,6-tri(alkyloxy)-S-triazines having 1 to about 20 exocyclic carbon atoms; and
   C. an amount of an organic peroxide free radical providing compound sufficient to cause crosslinking of the difunctional monomer diester with the 2-cyanoacrylates.

3. A solidified adhesive compound exhibiting hydrolytic stability which solidified adhesive compound results from combining components A, B and C as follows:
   A. a polymerizable monomeric 2-cyanoacrylate portion of
      1. from 75 to 85 parts by weight of allyl 2-cyanoacrylate;
      2. from 5 to 20 parts by weight of an alkyl 2-cyanoacrylate having the formula

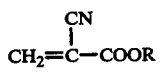

wherein R is alkyl having 6 to 10 carbon atoms;
3. from 1.5 to 3 parts by weight of a difunctional monomer diester of an acid from the group consisting of acrylic and methacrylic acid and a diol having an aromatic nucleus; and
4. from 5 to 10 parts by weight of a 2-cyanoacrylate compatible polymeric thickener;

B. from 0.05 to 1.5 weight percent based upon the weight of component A of an imino initiator selected from 2,4,6-tri(allyloxy)-S-triazine and tri(alkyloxy)-S-triazines having 1 to about 20 exocyclic carbon atoms; and C. an amount of an organic peroxide free radical providing compound sufficient to cause crosslinking of the difunctional monomer diester with the 2-cyanoacrylates.

4. A solidified adhesive compound exhibiting hydrolytic stability which solidified adhesive compound results from combining components A, B and C as follows:

A. a polymerizable monomeric 2-cyanoacrylate portion of
1. from 75 to about 85 parts by weight of allyl 2-cyanoacrylate;
2. from 5 to 20 parts by weight of octyl 2-cyanoacrylate;
3. from 1.5 to about 3 parts by weight of a difunctional monomer diester selected from the group consisting of bisphenol A dimethacrylate, bis(hydroxyethyl terephthalate), diacrylate, and p-xylylene glycol bisacrylate;
4. from 5 to about 10 parts by weight of a thickening agent selected from poly(methyl methacrylate), poly(methyl acrylate-co-acrylonitrile), or poly(ethyl acrylate);

B. from 0.05 to about 1.5 weight percent based on the weight of component A of a cyclic imino initiator selected from the group consisting of 2,4,6-tri(allyloxy)-S-triazine and 2,4,6-tri(n-propoxy)-S-triazines; and C. an amount of an organic peroxide free radical providing compound sufficient to cause crosslinking of the difunctional monomer diester with the 2-cyanoacrylates.

5. The composition of claim 4 wherein the difunctional monomer diester is bisphenol A dimethacrylate, the thickening agent is poly(methyl methacrylate), the initiator is 2,4,6-tri(n-propoxy)-S-triazine.

6. The composition of claim 5 wherein the free radical providing compound is benzoyl peroxide.

7. The composition of claim 4 wherein the difunctional monomer diester is bisphenol A dimethacrylate, the thickening agent is poly(methyl methacrylate), the initiator is 2,4,6-tri(allyloxy)-S-triazine.

8. The composition of claim 5 wherein the free radical providing compound is benzoyl peroxide.

* * * * *